United States Patent
Noh et al.

(10) Patent No.: US 9,712,296 B2
(45) Date of Patent: Jul. 18, 2017

(54) HYBRID ZERO-FORCING BEAMFORMING METHOD AND APPARATUS

(71) Applicants: Samsung Electronics Co., Ltd., Gyeonggi-do (KR); Industry-Academic Cooperation Foundation, Yonsei University, Seoul (KR)

(72) Inventors: Jeehwan Noh, Seoul (KR); Taeyoung Kim, Gyeonggi-do (KR); Chungyong Lee, Seoul (KR)

(73) Assignees: Samsung Electronics Co., Ltd (KR); Industry-Academic Cooperation Foundation, Yonsei University (KR)

(*) Notice: Subject to any disclaimer, the term of this patent is extended or adjusted under 35 U.S.C. 154(b) by 132 days.

(21) Appl. No.: 14/584,643

(22) Filed: Dec. 29, 2014

(65) Prior Publication Data

US 2015/0188682 A1    Jul. 2, 2015

(30) Foreign Application Priority Data

Dec. 26, 2013   (KR) .................. 10-2013-0163598

(51) Int. Cl.
*H04B 7/06* (2006.01)
*H04L 5/00* (2006.01)
(Continued)

(52) U.S. Cl.
CPC ......... *H04L 5/0037* (2013.01); *H04B 7/0452* (2013.01); *H04B 7/0456* (2013.01);
(Continued)

(58) Field of Classification Search
CPC . H04B 7/0473; H04B 7/0486; H04L 25/0204; H04L 25/03343; H04L 27/34; H04L 5/0023; H04L 5/0035
See application file for complete search history.

(56) References Cited

U.S. PATENT DOCUMENTS 8,929,473 B2 * 1/2015 Ayach ................ H04B 7/0478
375/267
2012/0257664 A1  10/2012 Yue et al.
(Continued)

OTHER PUBLICATIONS

Taeyoung Kim et al., "Tens of Gbps Support with mmWave forming Systems for Next Generation Communications", Globecom 2013—IEEE Wireless Communications Symposium, Dec. 9, 2013, 6 pages.
(Continued)

*Primary Examiner* — Ayaz Sheikh
*Assistant Examiner* — Debebe Asefa
(74) *Attorney, Agent, or Firm* — The Farrell Law Firm, P.C.

(57) ABSTRACT

Communication methods of a base station and a terminal are provided. The communication method of the base station includes receiving feedback information including ray gain information from a terminal, configuring a Radio Frequency (RF) precoder to minimize a Frobenius norm of a total transmit precoder of the base station, and configuring a baseband precoder based on Zero-Forcing (ZF). The communication method of the terminal includes receiving a pilot signal from a base station; estimating a channel of the terminal using the pilot signal; configuring ray gain information based on information of the estimated channel; and feeding back a codebook index corresponding to the ray gain information to the base station.

24 Claims, 11 Drawing Sheets

(51) Int. Cl.
    *H04L 25/02*     (2006.01)
    *H04W 72/04*     (2009.01)
    *H04W 8/08*     (2009.01)
    *H04W 8/02*     (2009.01)
    *H04B 7/0452*     (2017.01)
    *H04B 7/0456*     (2017.01)
    *H04W 88/08*     (2009.01)
    *H04W 88/02*     (2009.01)

(52) U.S. Cl.
CPC ......... *H04B 7/0617* (2013.01); *H04B 7/0626* (2013.01); *H04B 7/0634* (2013.01); *H04B 7/0639* (2013.01); *H04B 7/0686* (2013.01); *H04L 25/0204* (2013.01); *H04L 25/0224* (2013.01); *H04W 72/0413* (2013.01); *H04W 88/02* (2013.01); *H04W 88/08* (2013.01)

(56) References Cited

U.S. PATENT DOCUMENTS

| | | |
|---|---|---|
| 2013/0028341 A1 | 1/2013 | Ayach et al. |
| 2013/0044683 A1 | 2/2013 | Maltsev et al. |
| 2013/0237261 A1* | 9/2013 | Bazzi ................ H04L 25/03343 455/501 |

OTHER PUBLICATIONS

European Search Report dated Jun. 17, 2015 issued in counterpart application No. 14200343.3-1852, 10 pages.

\* cited by examiner

HYBRID ZERO-FORCING BEAMFORMING METHOD AND APPARATUS

PRIORITY

This application claims priority under 35 U.S.C. §119(a) to a Korean Patent Application filed Dec. 26, 2013 in the Korean Intellectual Property Office and assigned Serial No. 10-2013-0163598, the entire contents of which are incorporated herein by reference.

BACKGROUND

1. Field of the Invention

The present invention relates generally to a multi-user transmission/reception method and apparatus based on the hybrid beamforming in a millimeter-wave communication system, and more particularly, to a Radio Frequency (RF) precoder configuration method for use in Zero-Forcing (ZF) mode and a limited feedback-based channel information acquisition method of a base station.

2. Description of the Related Art

Millimeter wave transmission is advantageous in transmitting large volumes of data in a high frequency band. Since a millimeter wave has a high frequency and thus makes it possible to narrow the distance between antennas, it is possible for a base station to use more antennas.

In order to compensate for signal attenuation in a millimeter wave channel, it is inevitable for a base station to adopt a beamforming technique. In order to use digital beamforming in a multi-antenna environment, however, there is a limit in view of hardware as well as in the number of RF chains.

In order to address this issue, a hybrid beamforming technique may be used, which consists of digital and analog components. A Radio Frequency (RF) precoder may be configured with an array steering vector such as in legacy analog beamforming, and a baseband precoder may be used for digital beamforming.

FIG. 1 is a diagram illustrating a beamforming technique in a conventional multi-antenna communication system.

Referring to FIG. 1, a sender 110, e.g. base station, includes a baseband precoder 115 and an RF precoder 113 to perform beamforming in hybrid mode. In this case, the sender 110 is provided with a plurality of antennas.

Assuming that the number of transmission and reception antennas is infinite in a single user environment, beamforming can be optimized with Equation (1) using an array steering vector.

$$F_{RF} = [a_t(\phi_1^t), \ldots, a_t(\phi'_{N_s})] \text{ for } |\alpha_i| \geq |\alpha_j|, \forall i<j, F_{BB}:\text{ power allocation} \quad (1)$$

However, the conventional method is limited to single user beamforming, and there is no hybrid beamforming technique suited for the multi-user environment. The conventional method is also susceptible to inter-user interference, which results in performance degradation. The conventional method is based on the assumption of full Channel State Information (CSI) without any detail on the channel feedback mechanism.

SUMMARY

The present invention has been made to address the above-mentioned problems and disadvantages, and to provide at least the advantages described below. Accordingly, an aspect of the present invention provides a method of configuring an RF precoder suited for a system in which a Zero-Forcing (ZF) technique is applied to the baseband precoder for canceling inter-user interference.

Another aspect of the present invention provides a method for changing the configuration of an RF precoder for channel efficiency in view of transmit (Tx) ZF beamforming.

Another aspect of the present invention provides a hybrid beamforming method using limited feedback for the base station to acquire per-user channel information.

In accordance with an aspect of the present invention, a communication method of a base station is provided. The communication method includes receiving feedback information including ray gain information from a terminal, configuring a Radio Frequency (RF) precoder to minimize a Frobenius norm of a total transmit precoder of the base station, and configuring a baseband precoder based on Zero-Forcing (ZF).

In accordance with another aspect of the present invention, a communication method of a terminal is provided. The communication method includes receiving a pilot signal from a base station, estimating a channel of the terminal using the pilot signal, configuring ray gain information based on information of the estimated channel, and feeding back a codebook index corresponding to the ray gain information to the base station.

In accordance with another aspect of the present invention, a base station is provided. The base station includes a communication unit configured to communicate with a terminal and a control unit configured to control receiving feedback information including ray gain information from the terminal and configure a Radio Frequency (RF) precoder to minimize a Frobenius norm of a total transmit precoder of the base station and a baseband precoder based on Zero-Forcing (ZF).

In accordance with another aspect of the present invention, a terminal is provided. The terminal includes a communication unit configured to communicate with a base station and a communication unit configured to control the communication unit to receive a pilot signal from the base station, estimate a channel of the terminal using the pilot signal, configure ray gain information based on information of the estimated channel, and control the communication unit to transmit a codebook index corresponding to the ray gain information to the base station.

BRIEF DESCRIPTION OF THE DRAWINGS

The above and other aspects, features, and advantages of the present invention will be more apparent from the following detailed description, taken in conjunction with the accompanying drawings, in which.

DETAILED DESCRIPTION OF THE EMBODIMENTS OF THE PRESENT INVENTION

Embodiments of the present invention are described with reference to the accompanying drawings in detail. The same reference numbers are used throughout the drawings to refer to the same or like parts. Detailed description of well-known functions and structures incorporated herein are omitted to avoid obscuring the subject matter of the present invention. Further, the following terms are defined in consideration of the functionality in the present invention, and may vary according to the intention of a user or an operator, usage, etc. Therefore, the definition should be made on the basis of the overall content of the present specification.

Figure 1:
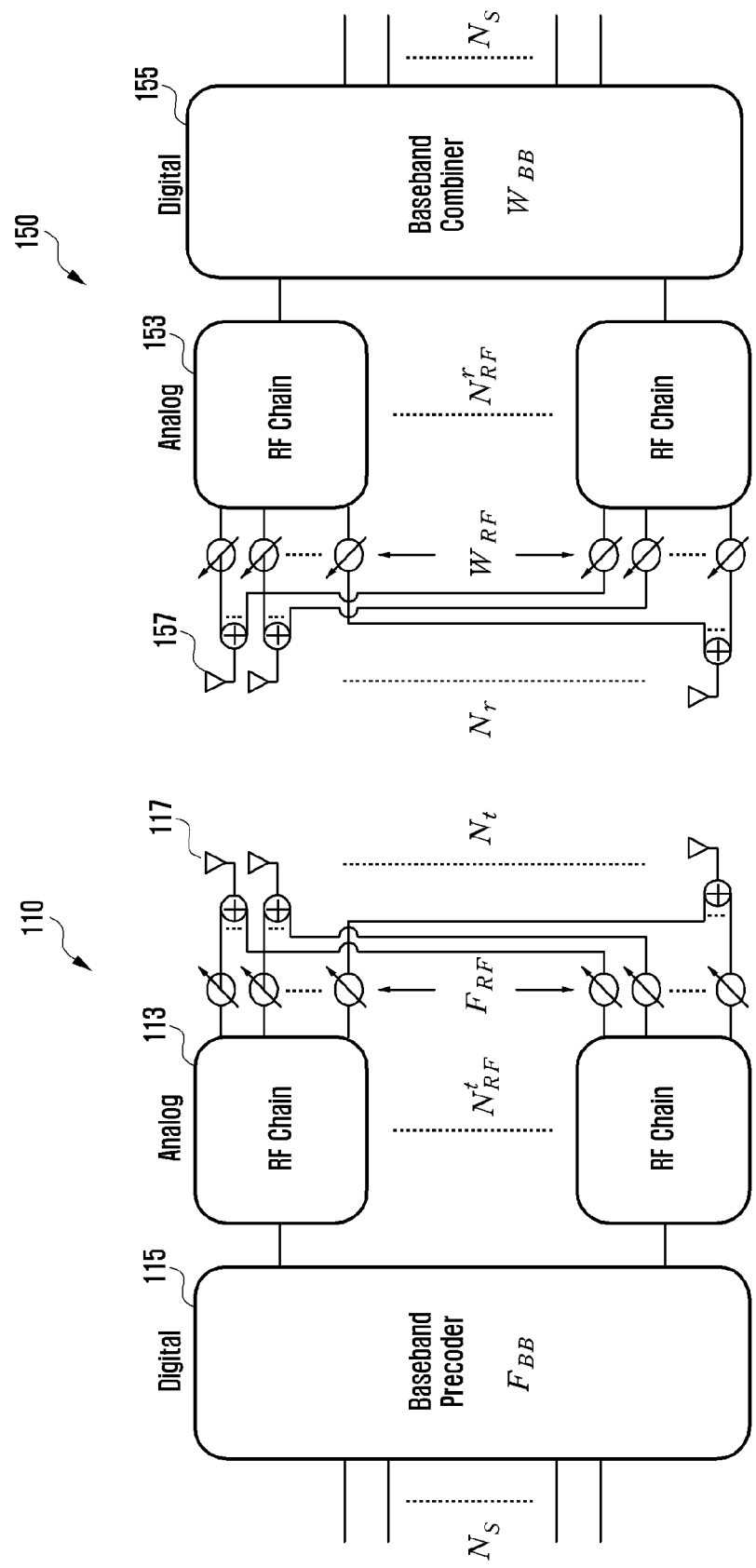
FIG. 1 is a diagram illustrating a beamforming technique in a conventional multi-antenna communication system.
Figure 2:
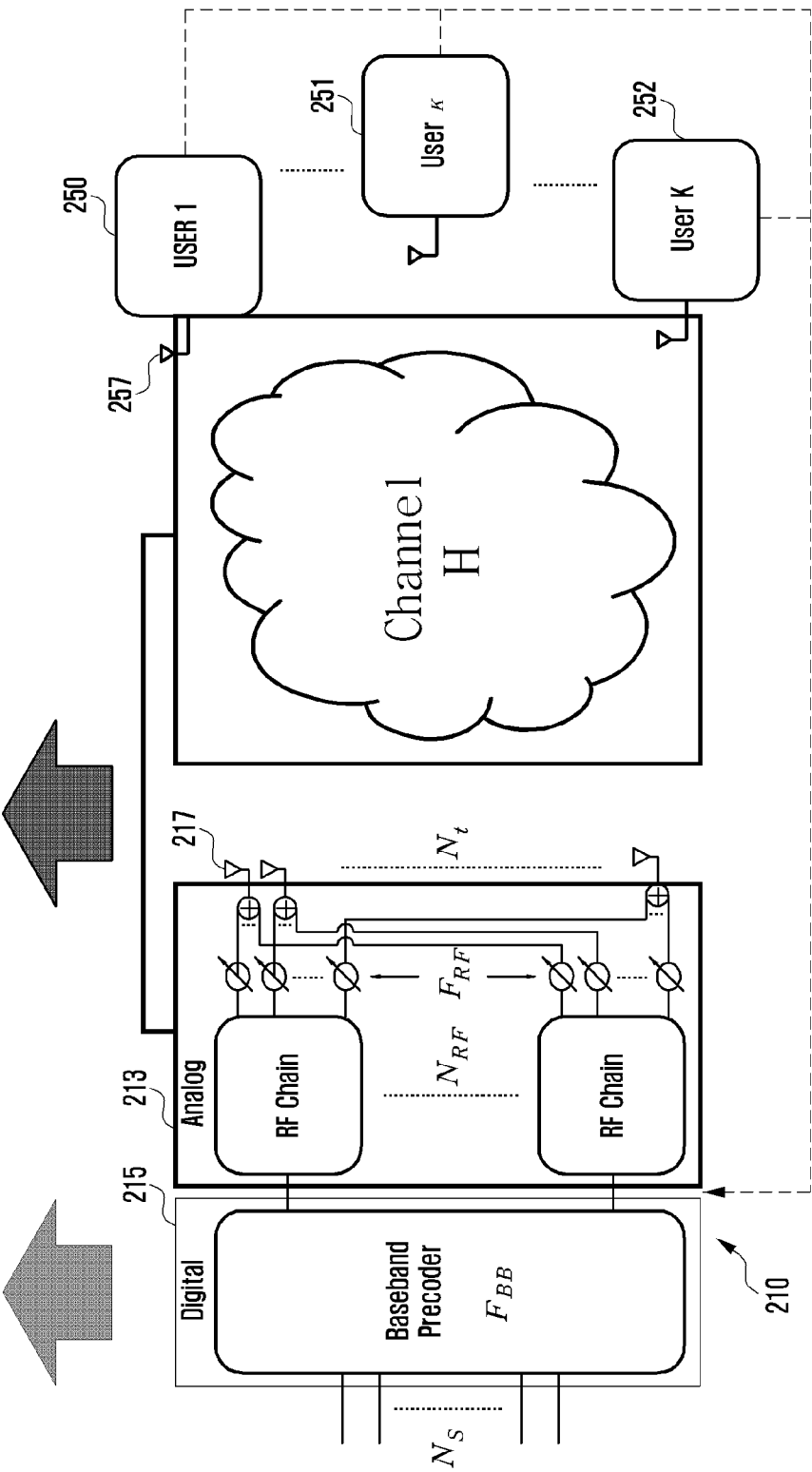
FIGS. 2 and 3 are diagrams illustrating hybrid transmission mechanisms in a multi-user millimeter wave transmission system according to an embodiment of the present invention.
Figure 3:
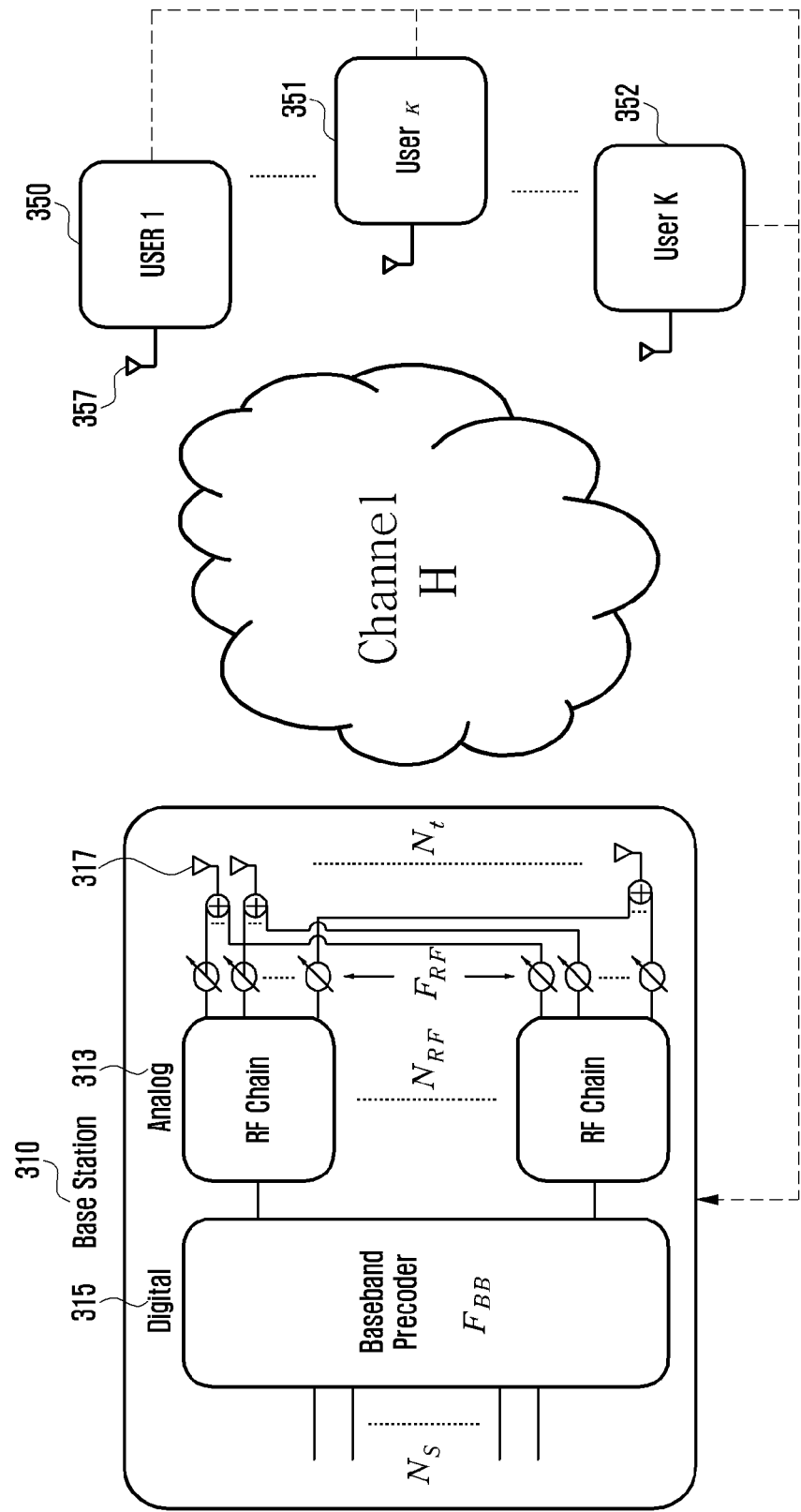

FIGS. 2 and 3 are diagrams illustrating hybrid transmission mechanisms in a multi-user millimeter wave transmission system according to an embodiment of the present invention.

Referring to FIG. 2, a base station 210 includes a baseband precoder 215 and an RF precoder 213.

In the case of applying a ZF technique to the baseband precoder 213 to cancel inter-user interference, it is necessary to suitably configure the RF precoder 213 for this system. It is also required to provide a hybrid beamforming method based on limited feedback in order for the base station 210 to acquire per-user channel information.

In the embodiment of the present invention illustrated in FIG. 3, it is assumed that the base station 310 uses a plurality of antennas 317 while the user, i.e. the respective users 350, 351, and 352, uses a single antenna 357. For explanation convenience, the terms "user" and "user terminal" are used interchangeably.

In this environment, the channel between the base station 310 and the user terminals 350, 351, and 352 can be expressed as Equation (2).

$$h_k = \sqrt{\frac{N_t}{L}} \sum_{l=1}^{L} \alpha_l^k a^k(\varphi_l^k)^H \quad (2)$$

In Equation (2), $N_t$ denotes a number of base station antennas, and L denotes a number of rays constituting the channel. $\alpha$ denotes path gain, $\phi$ denotes Angle Of Departure (AOD) of the corresponding ray, and "a" denotes an array steering vector. The multi-user channel consisting of per-user channels becomes $H=[h_1^T \ldots h_K^T]^T$.

In this case, the signal x transmitted by the base station can be expressed as Equation (3).

$$x = \hat{F}s = \sum_{i=1}^{K} \frac{\sqrt{P}}{\|F\|_F} F_{RF} F_{BB}^{(i)} s_i \quad (3)$$

In Equation (3), $S_i$ denotes the signal allocated to the $i^{th}$ user. $F_{BB}^{(i)}$ denotes the $i^{th}$ row of the baseband precoder, and $F_{RF}$ denotes the RF precoder. F denotes total transmit (Tx) precoder, i.e. both the baseband precoder and the RF precoder, and $\hat{F}$ denotes the normalized total Tx precoder. P denotes the Tx power of the base station, and K denotes a number of all users.

Assuming the total user channel (H) and the RF precoder as one effective channel. $H_{eff}=HF_{RF}$, the ZF-based baseband precoder RBB can be expressed as equation (4).

$$F_{BB}=H_{eff}^H(H_{eff}H_{eff}^H)^{-1} \quad (4)$$

From Equations (2) to (4), the received signal $y_i$ of the user I can be expressed as Equation (5).

$$\begin{aligned}
y_i &= h_{(i)}x + n_i \\
&= \frac{\sqrt{P}}{\|F\|_F} h_{(i)} F_{RF} F_{BB}^{(i)} s_i + \sum_{k \neq i} \frac{\sqrt{P}}{\|F\|_F} h_{(i)} F_{RF} F_{BB}^{(i)} s_k + n_i \\
&= \frac{\sqrt{P}}{\|F\|_F} s_i + n_i
\end{aligned} \quad (5)$$

Since ZF is applied at the base station, the signal gain of the base station, i.e. $h_{(i)}F_{RF}F_{BB}^{(i)}$, becomes 1, and the interference gain, i.e. $h_{(i)}F_{RF}F_{BB}^{(k)}$, becomes 0.

In this case, the sum-rate R can be expressed as Equation (6) by taking note of the received signals of all users.

$$R = \sum_{i=1}^{K} \log_2\left(1 + \frac{P}{\|F\|_F^2 \sigma_n^2}\right) \quad (6)$$

In addition, the present invention aims to design an RF precoder. In this case, $\|F\|_F^2$ is only the part modified by the RF precoder in the sum-rate of Equation (6). Accordingly, minimizing the Frobenius norm of the total precoder is equal to maximizing the sum-rate from the viewpoint of the RF precoder.

By using this characteristic, a condition to find the optimal RF precoder can be expressed as Equation (7).

$$F_{RF}^{opt} = \underset{F_{RF}}{\operatorname{argmin}} \|F\|_F = \underset{F_{RF}}{\operatorname{argmin}} \|F_{RF}F_{RF}^H H^H (HF_{RF}F_{RF}^H H^H)^{-1}\|_F \quad (7)$$

The method is to find the RF precoder 313 that fulfills the condition of Equation (7). In this case, it is required to find array steering vectors equal to the number of RF chains $N_{RF}$. In this case, the number of sets to be compared for finding the optimal RF precoder in accordance with $N_{RF}$ is $_{KL}P_{N_{RF}}$. Accordingly, the number of sets to be compared may increase exponentially as $N_{RF}$ increases.

In order to overcome the computation amount issue, a consecutive RF precoding scheme may be used, depending on the embodiment.

Figure 4:
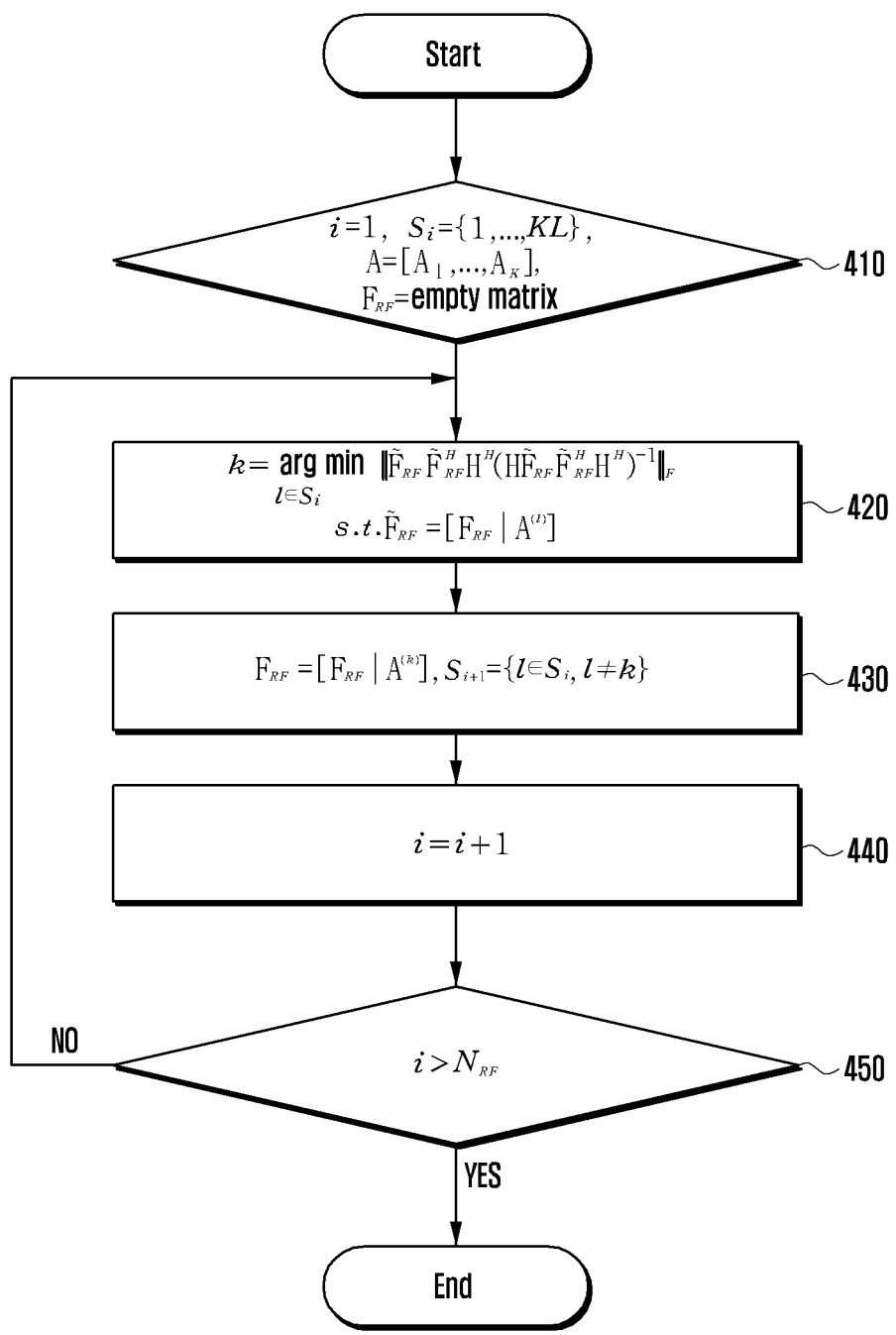
FIG. 4 is a flowchart illustrating a method of finding an RF precoder according to an embodiment of the present invention.

FIG. 4 is a flowchart illustrating a method of finding an RF precoder according to an embodiment of the present invention.

The concept of the consecutive precoding scheme according to the embodiment of the present invention illustrated in FIG. 4 is to find $N_{RF}$ array vectors minimizing $\|F\|_F$ one by one, instead of all at the same time.

That is, if there are $N_{RF}$ RF chains, the method of the present invention finds the array steering vector for the first RF chain and then finds the next array steering vector for the next RF chain in sequence, instead of finding the array steering vectors for all of the RF chains simultaneously.

For example, the method of the present invention sets i equal to 1 in step 410 and finds the $i^{th}$ RF chain, i.e. the first array steering vector for the first RF chain, in steps 420 and 430.

Then, the method of the present invention increases i by 1 in step 440. Then, the method of the present invention determines whether i is greater than the number of RF chains $N_{RF}$ in step 450. That is, the method of the present invention determines whether the array steering vectors for all of the RF chains have been found. If the array steering vectors for all of the RF chains have not been found, the method of the present invention returns to step 420.

Then, the method of the present invention repeats steps 420 to 430 to find the second array steering vector, increases i by 1 in step 440, and compares i with $N_{RF}$ in step 450. If i is greater than $N_{RF}$, this means that the number of array steering vectors found equals the number of RF chains and, thus, the RF precoding method terminates.

The RF precoder configuration based on this consecutive RF precoder design method is advantageous in terms of being capable of configuring the RF precoder simply without significant difference from the aforementioned optimal RF precoder configuration method in view of sum-rate.

That is, the number of sets to be compared $N_{RF}(2KL-N_{RF}+1)/2$ increases linearly as $N_{RF}$ RF increases in the consecutive RF precoder design method. In the case of the optimal RF precoder design method for finding a number of array steering vectors equal to the number of RF chains $N_{RF}$ simultaneously according to Equation (7), however, the number of sets to be compared increases exponentially as the number of RF chains $N_{RF}$ increases. This means that the consecutive RF precoder design method is superior to the optimal RF precoder design method in view of the amount of computation.

Depending on the embodiment of the present invention, it is possible to consider a user scheduling in addition to the optimal precoder design method.

In this case, the condition to find the optimal RF precoder can be expressed as Equation (8).

$$(F_{RF}^{opt}, H_j^{set}) = \underset{F_{RF}, H_j}{\mathrm{argmin}} \left\| F_{RF} F_{RF}^H H_j^H (H_j F_{RF} F_{RF}^H H_j^H)^{-1} \right\|_F \quad (8)$$

Hereinabove, a description has been made of a method of configuring the RF precoder suited for the system in the case where the ZF scheme is applied to the baseband precoder to cancel inter-user interference.

A description will now be made of a limited feedback-based hybrid beamforming method for a base station to acquire per-user channel information.

Figure 5:
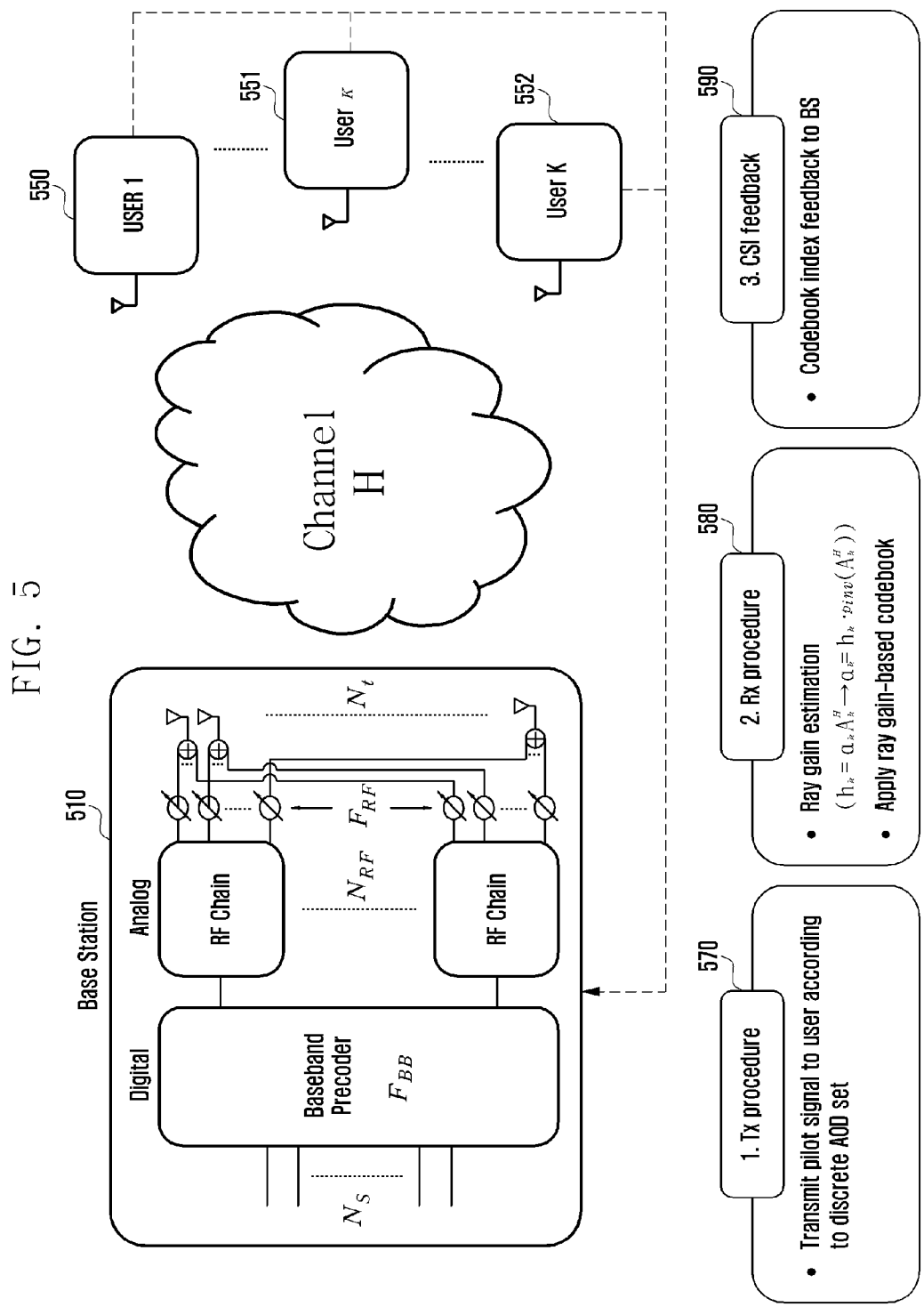
FIGS. 5 and 6 are diagrams illustrating a limited feedback method according to an embodiment of the present invention.
Figure 6:
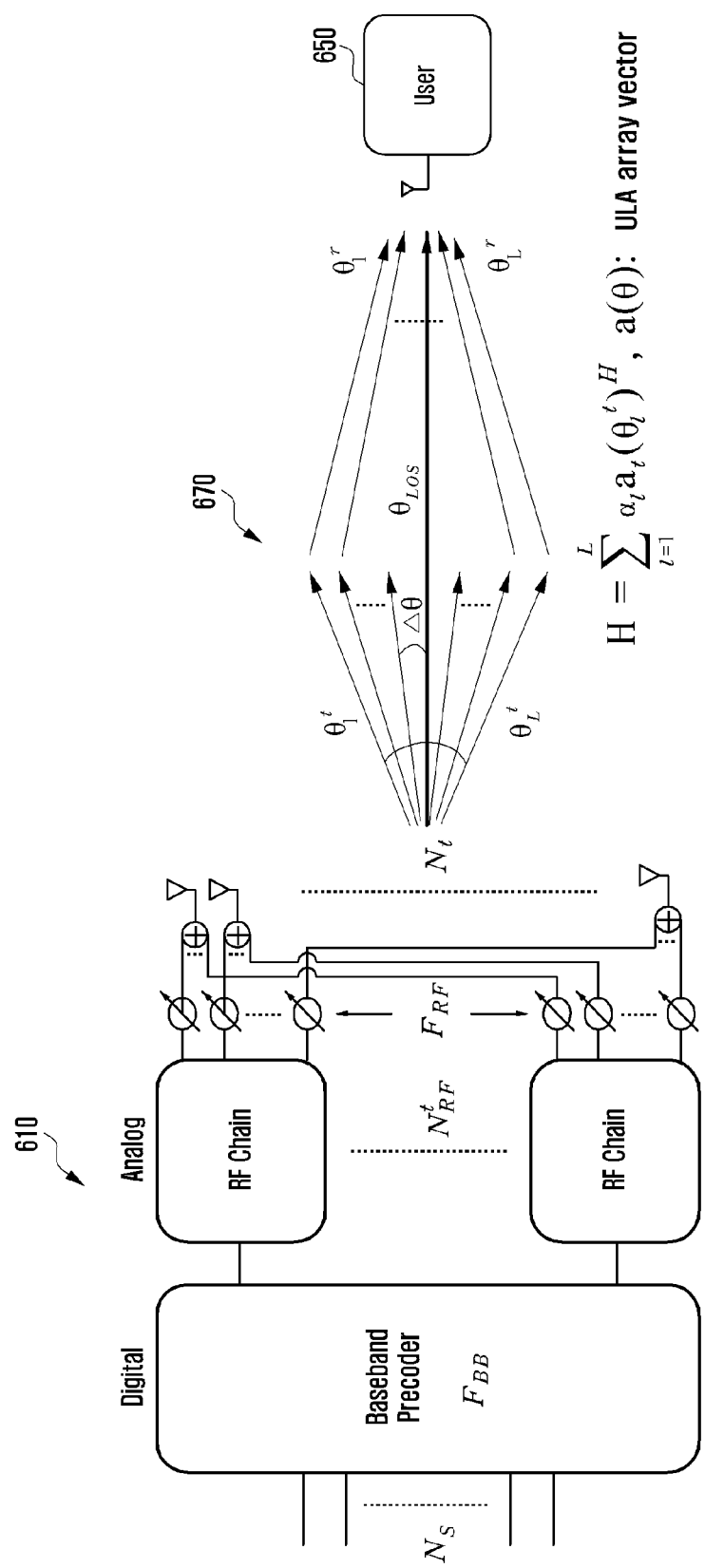

FIGS. 5 and 6 are diagrams illustrating the limited feedback method according to an embodiment of the present invention.

In a system architecture according to an embodiment of the present invention, the base station must know the Angle Of Departure (AOD) and ray gain information of a channel as well as the per-user channel information. That is, the base station transmits a pilot signal at a predetermined pilot symbol power in a predetermined AOD range between the transmitter and the receiver. The user terminal estimates AOD and ray gain based on the received signal to configure the millimeter wave channel like $(h_i = \Sigma_i^t, \alpha_i a_i(\theta_i^t)^{ii} = a_i A_i^{ii})$.

The user terminal sends the base station feedback information on all of the rays, i.e. AOD of the channel and ray gain information.

In the embodiment of the present invention in which it is assumed that each user has one antenna, however, it is difficult to estimate a large number of AODs corresponding to all the rays constituting the channel of the user. There is, therefore, a need of a feedback scheme capable of estimating the AODs and ray gains and sharing the informations which is suited for the millimeter wave channel environment.

Referring to FIG. 5, the millimeter channel estimation and limited feedback method consists of three procedures. First, the base station transmits a pilot signal to the users according to a pre-negotiated discrete AOD set in step 570.

Each user estimates a channel using the pilot signal and configures an array matrix using the AOD set in step 580. Then, each user obtains a ray gain vector by multiplying a pseudo inverse matrix of the array matrix with the estimated channel.

The user feeds back the information on the estimated gain vector to the base station using a codebook in step 590.

A detailed description is provided below of the discrete AOD-based pilot transmission scheme of the proposed limited feedback procedure.

Referring to FIG. 6, the AODs 670 of all of the rays are formed in a narrow range centered around the AOD of the Line-of-Sight (LOS) ray by nature of the millimeter wave channel having the LOS component and significant attenuation. For example, L AOD sets may be formed in the range from $\theta_{LOS}+40°$ to $\theta_{LOS}-40°$ centered around $\theta_{LOS}$. The base station transmits the pilot signal at discrete AODs within this range. According to an embodiment of the present invention, the information on the AOD sets may be shared between the base station and the users. The discrete AOD pilot signal may be expressed as Equation (9).

$$\mathbf{X}_{pilot} = F_{pilot} s_{pilot}, \quad F_{pilot} = [a(\theta_1), \ldots, a(\theta_L)] \quad (9)$$

This method is advantageous in that there is no need of extra feedback of AOD because the information on the AOD sets is shared between the base station and the users in advance.

A detailed description is provided below of the ray gain information feedback method.

Each user channel can be expressed as $h_k = a_k A_k^H$ in the form of a vector. It is possible to estimate the ray gain vector $a_k$ based on the channel $h_k$ estimated via the discrete AOD scheme and the array matrix configured with the pre-negotiated AOD sets as expressed by Equation (10).

$$a_k = h_k \cdot pmv(A_k^H) \quad (10)$$

The information on the ray gain vector estimated in this way is sent to the base station by means of a codebook, and the present invention uses a Random Vector Quantization (RVQ).

The basic RVQ technique is described first. If a number of feedback bits is B, the per-user codebook consists of $N=2^B$ normal vectors as shown in Equation (11).

$$C_k = \{c_{k1}, \ldots, c_{kN}\} \quad (11)$$

Each user terminal compares its own channel direction $\bar{h}_k = h_k / \|h_k\|$ with the codebook to select the closest vector $\hat{h}_k$ as shown in Equation (12).

$$\hat{h}_k = c_{kn}, \text{ where } n = \arg\max_{1 \leq j \leq N} |\bar{h}_k c_{kj}^H| \quad (12)$$

Afterward, the user terminal feeds back the index of the selected vector to the base station. The base station configures the channel based on the feedback information.

However, if the legacy RVQ technique is applied to the proposed system model without modification, the limited feedback information amount may cause performance degradation in an environment with a large number of transmit antennas.

Accordingly, in the present invention, the RVQ is applied to the ray gain vector other than the channel vector of the user. In the hybrid beamforming in the millimeter wave channel, the length of the ray gain vector of the channel is about 5 to at most 20 which is short compared with a few dozen to a few hundred base station antennas. Since the length of the ray gain vector is relatively short compared to the length of the channel vector, it is advantageous to apply the RVQ to the ray gain vector in view of performance improvement gain when the same size RVQ codebook is used.

Figure 7:
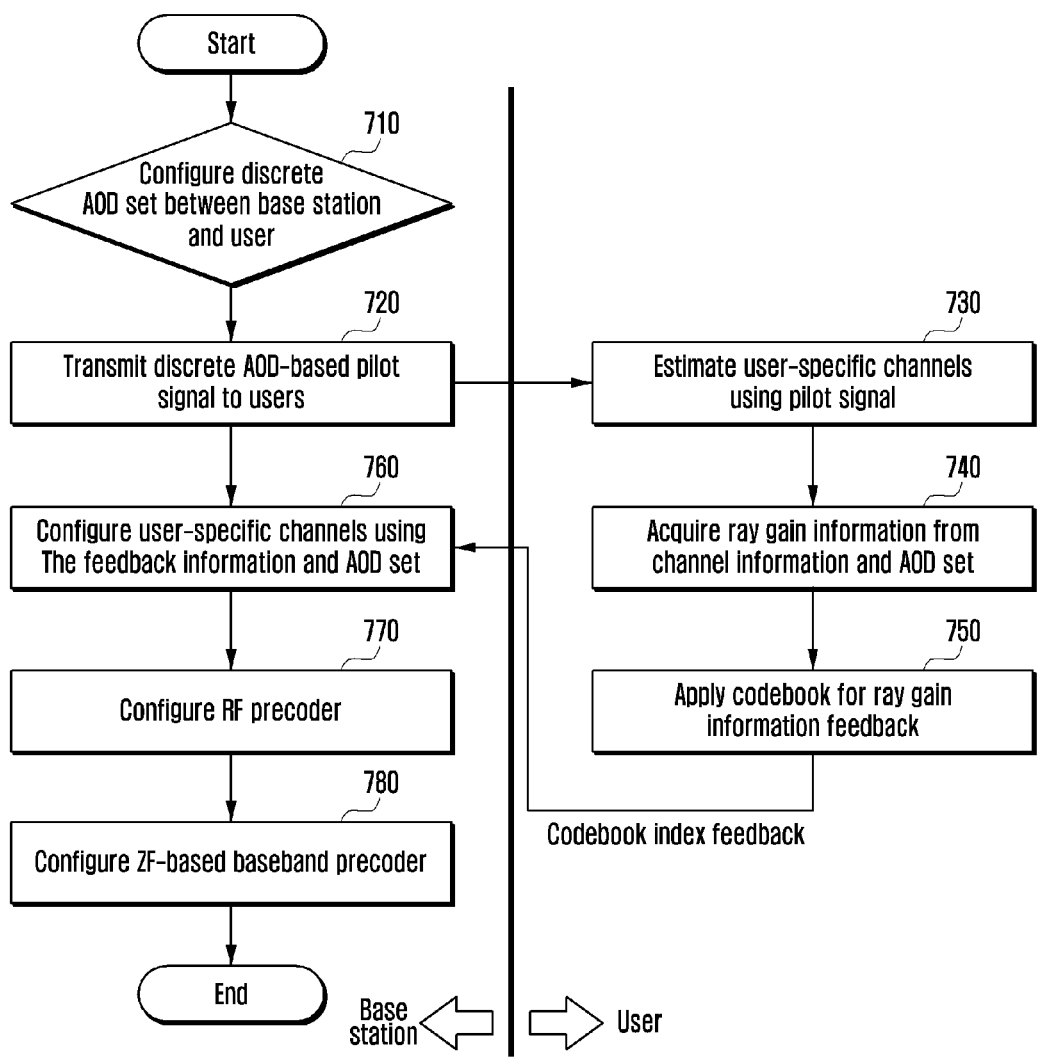
FIG. 7 is a flowchart illustrating the operation of a hybrid beamforming system according to an embodiment of the present invention.

FIG. 7 is a flowchart illustrating the operation of the hybrid beamforming system according to an embodiment of the present invention.

Referring to FIG. 7, the base station configures a discrete AOD set information for use between the base station and the user in step 710. Next, the base station transmits the discrete AOD-based pilot signals to the users in step 720.

The user terminal estimates the user-specific channel using the pilot signal in step 730. Next, the user terminal acquires the ray gain information from the channel information and AOD set in step 740. The user terminal selects a codebook for use in ray gain information feedback and sends the selected codebook index to the base station in step 750.

The base station configures the user-specific channels using the codebook index for the ray gain vector and AOD set information in step 760. The base station configures an RF precoder in step 770. The base station configures a ZF-based baseband precoder in step 780.

Since the operations in the respective steps are identical with those described with reference to FIGS. 2 to 6, detailed descriptions thereof are omitted herein.

FIGS. 8A to 11B are graphs illustrating variation of sum rate in the case of using the hybrid beamforming technique according to an embodiment of the present invention.

Figure 8A:
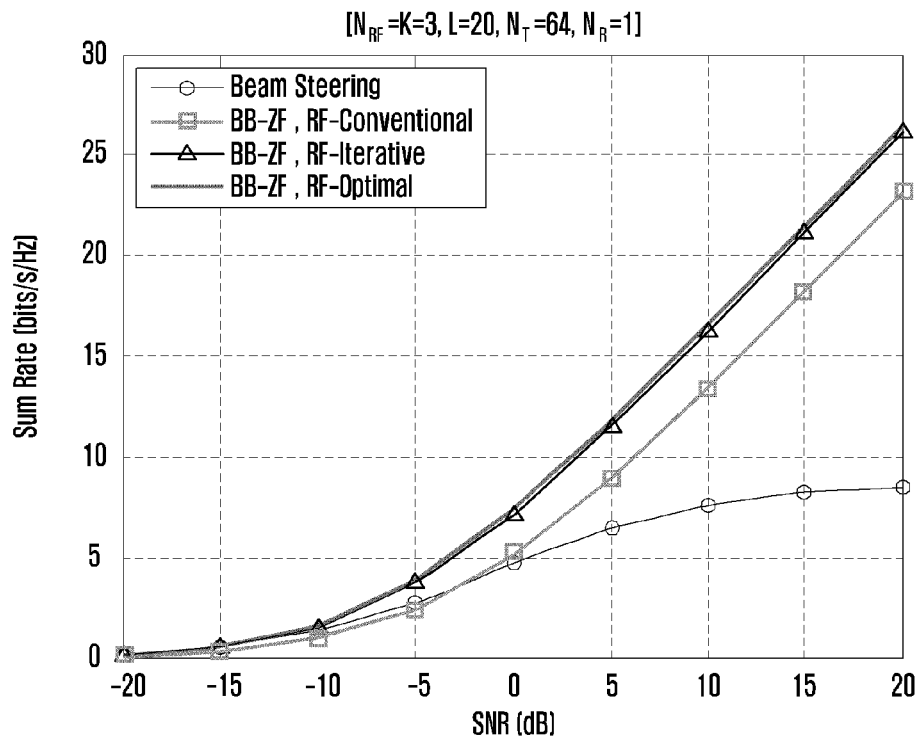
FIGS. 8A to 11B are graphs illustrating variation of sum rate in the case of using a hybrid beamforming technique according to an embodiment of the present invention.

Referring to FIG. 8A, the graph shows that the sum rate of the RF precoder configured according to the proposed method of the present invention is higher than that of the conventional ZF-based method. It is shown that there is no significant difference in sum rate between the method of configuring the array steering vectors equal to the plural RF chains simultaneously according to Equation (7) and the method of configuring the array steering vectors in sequence (i.e., one by one).

Figure 8B:
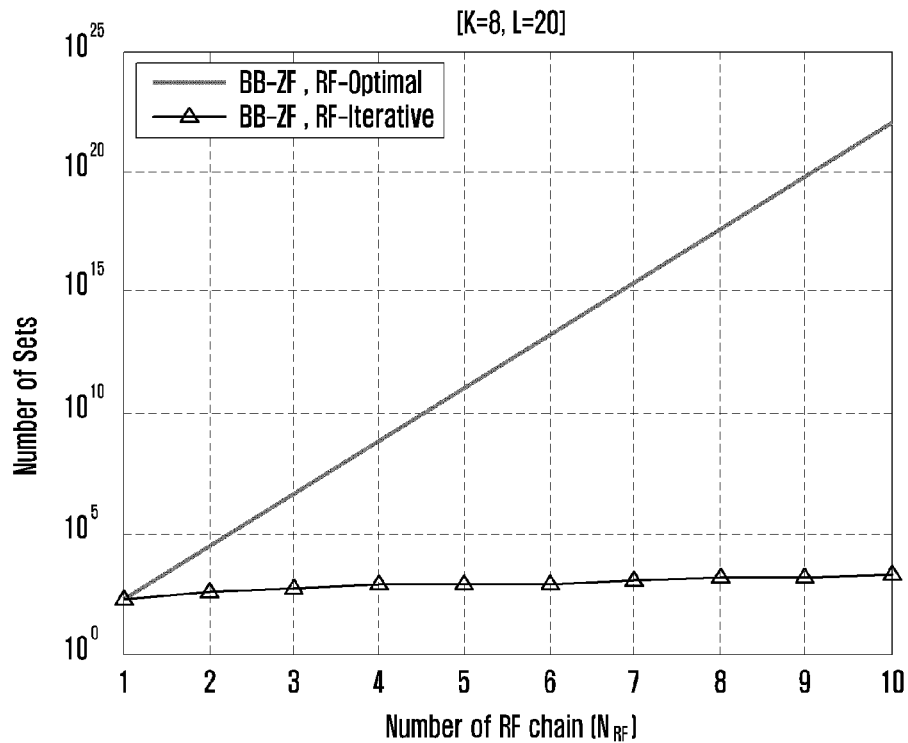

Referring to FIG. 8B, the graph shows that, in the case of finding the array steering vector simultaneously, the number of sets to be compared increases exponentially as the number of RF chain increases. In the case of finding the array steering vectors one by one, however, it is shown that the number of sets to be compared increases linearly as the number of RF chains increases.

Accordingly, when the number of RF chains is large, it is advantageous to use the method of finding out the array steering vectors in sequence in view of computational efficiency.

Figure 9A:
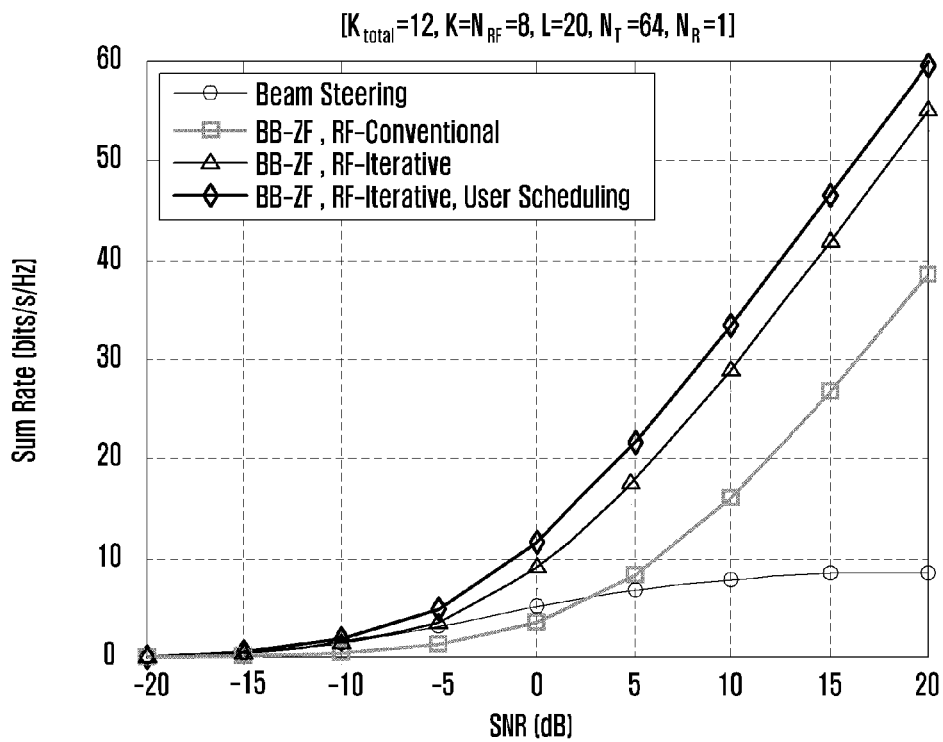

Referring to FIG. 8A and FIG. 9A, it is shown that the sum rate increases as the number of RF chains $N_{RF}$ increases. In this case, the graph shows the additional performance gain in the case of applying the user scheduling.

Figure 9B:
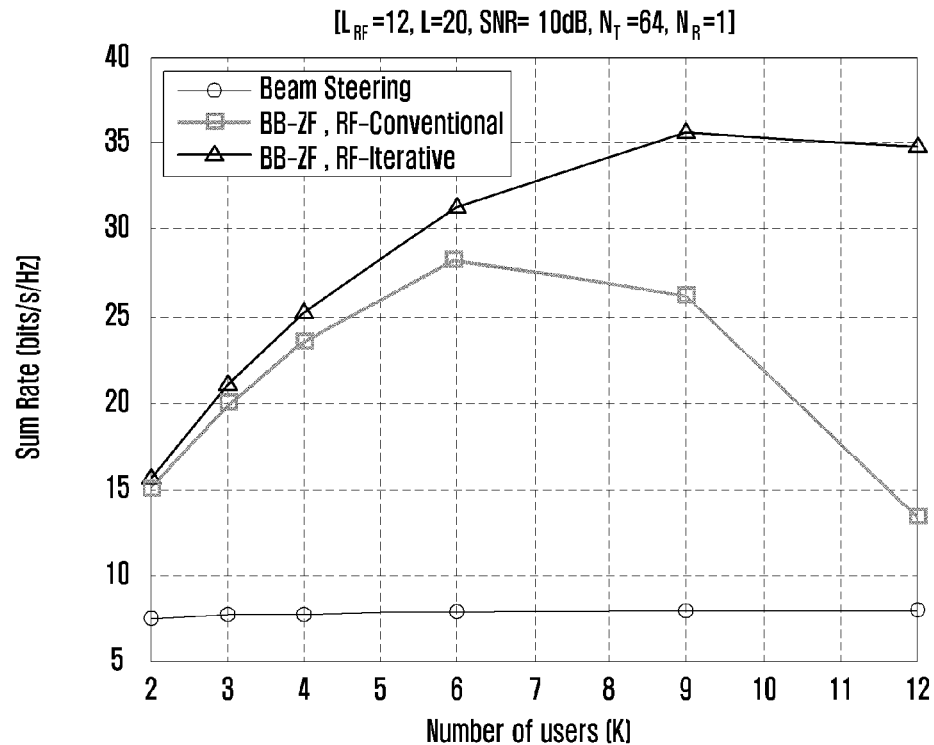

Referring to FIG. 9B, it is shown that the method of using the beamforming technique according to an embodiment of the present invention is superior to the convention method in view of the sum rate as the number of users K increases. That is, the method according to an embodiment of the present invention shows that the sum rate does not decrease significantly although the number of users increases when the number of users K is less than the number of RF chains $N_{RF}$. In contrast, the conventional method shows that the sum rate drops abruptly as the number of users reaches the number of RF chains.

Figure 10A:
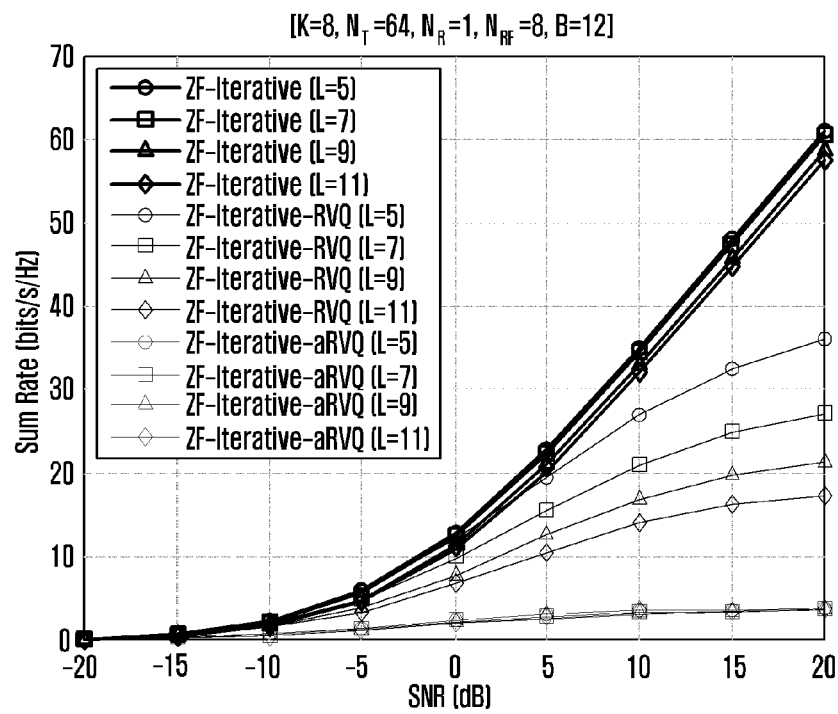
Figure 10B:
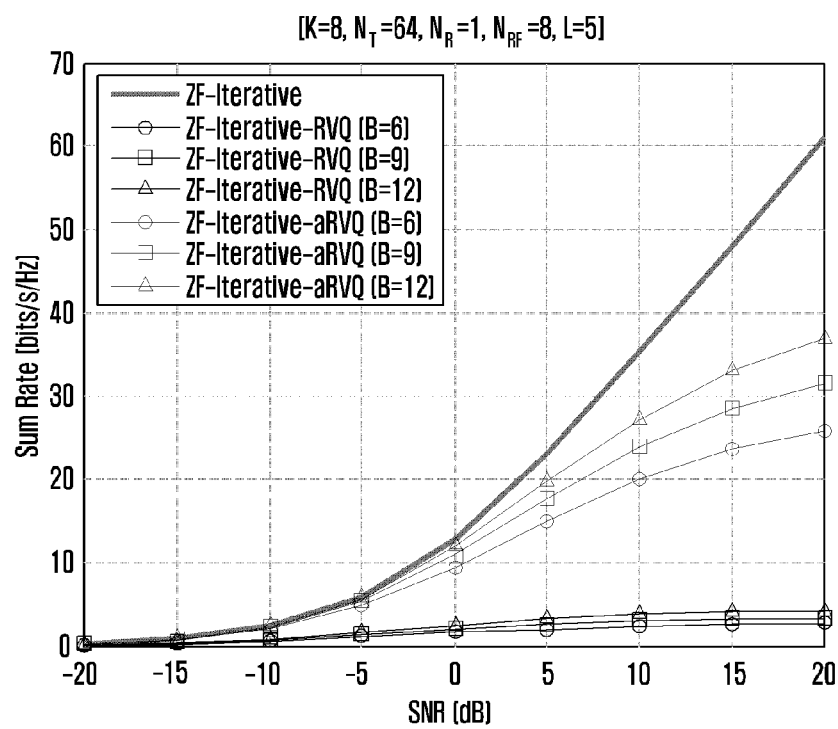

Referring to FIG. 10A, the graph shows that the proposed method in which the RVQ is applied to the ray gain vector according to an embodiment of the present invention (i.e., a-RVQ) obtains more performance gain as compared to the normal RVQ method. The graph also shows that the performance increases as the number of rays per channel decreases. Referring to FIG. 10B, the graph shows that the performance gain increases as the feedback information amount (B) increases.

Figure 11A:
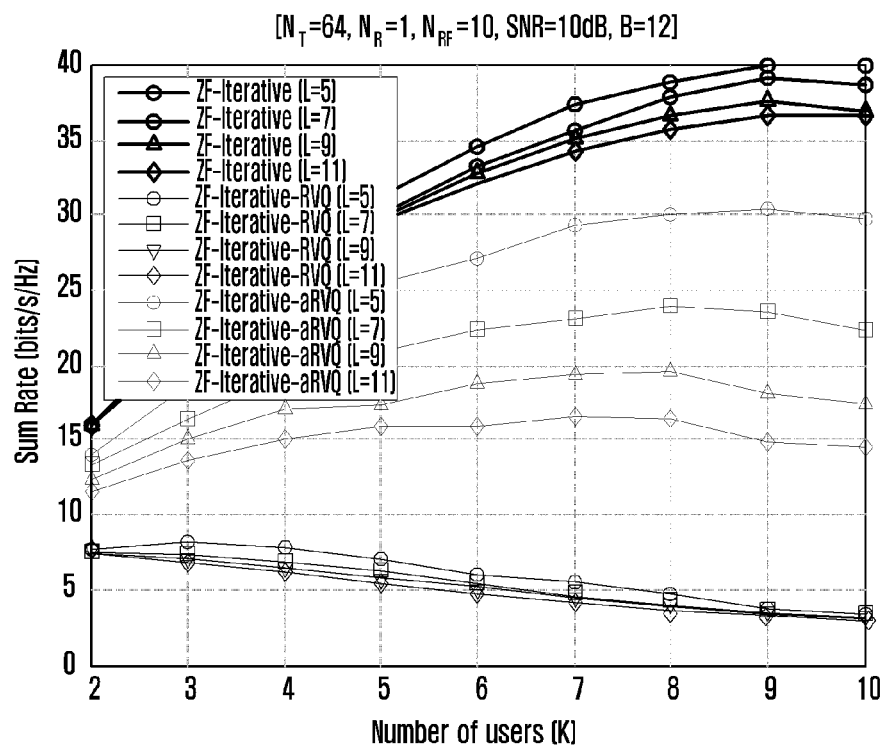
Figure 11B:
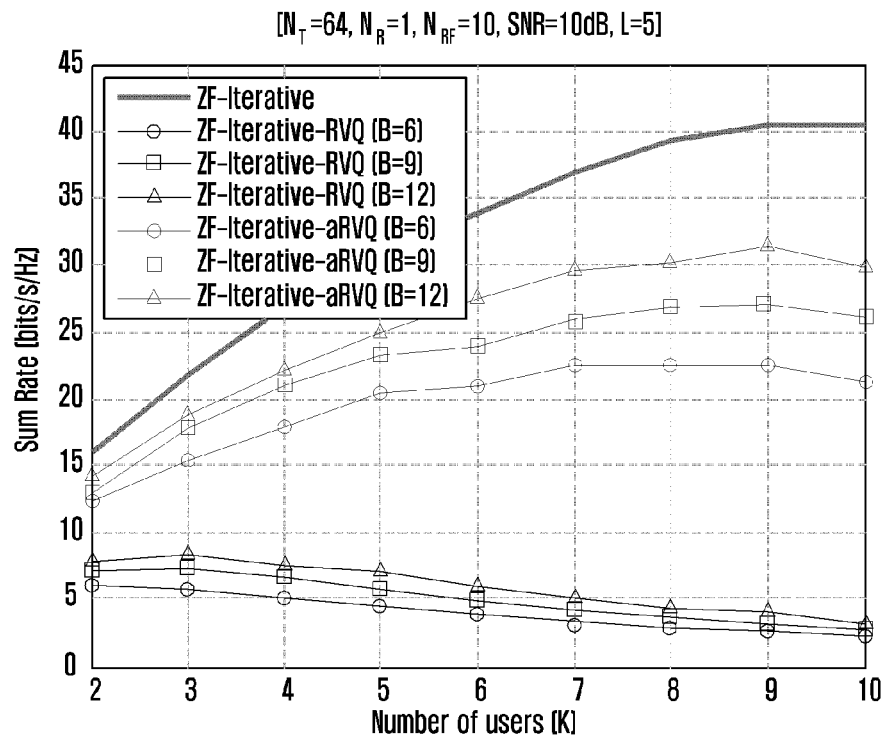

FIGS. 11A and 11B show variation of performance gain as the number of users increases according to an embodiment of the present invention. Referring to FIG. 11A, the graph shows that the performance gain increases as the number of rays per channel decreases similar to FIG. 10A. Referring to FIG. 11B, the graph shows that the performance gain increases as the feedback information amount increases.

Hereinabove, descriptions are provided of the advantageous effects of the method according to embodiments of the present invention.

A description is provided below of the configurations of the base station and the user terminal according to an embodiment of the present invention hereinafter.

The base station according to an embodiment of the present invention may include a communication unit and a control unit. The control unit may control overall operations of the base station. The control unit also may control the base station to perform the operation of one of the above embodiments of the present invention.

For example, the control unit configures the discrete AOD set information and controls the communication unit to transmit the discrete AOD-based pilot signal to the users. The control unit also controls the communication unit to receive the codebook index corresponding to the ray gain vector from the user terminal and configures the user-specific channels based on the feedback information and AOD sets. The control unit also configures an RF precoder and ZF-based baseband precoder.

The user terminal, according to an embodiment of the present invention, includes a communication unit and a control unit. The control unit controls the overall operations of the user terminal. The control unit controls the user terminal to perform the operation of one of the above described embodiments of the present invention.

For example, the control unit controls the communication unit to receive the discrete AOD-based pilot signal transmitted by the base station, estimates the channel based on the received pilot signal, and acquires the ray gain information from the channel information and the AOD sets. The control unit also controls the user terminal to select a codebook for ray gain information feedback and controls the communication unit to transmit the selected code book index to the base station.

As described above, the hybrid ZF beamforming method and apparatus of the present invention is advantageous in terms of providing an RF precoder suited for ZF hybrid beamforming.

In addition, the hybrid ZF beamforming method and apparatus of the present invention is advantageous in terms of providing a limited feedback mechanism suited for a millimeter wave channel.

Further, the hybrid ZF beamforming method and apparatus of the present invention is advantageous in that the hybrid beamforming is applicable in the multi-user environment through RF precoder configuration.

Furthermore, the hybrid ZF beamforming method and apparatus of the present invention is advantageous in terms of reducing the per-user channel feedback amount via a proposed feedback mechanism.

The advantages of the present invention are not limited to the aforesaid, and other advantages not described herein may be clearly understood by those skilled in the art from the descriptions below.

Although embodiments of the present invention have been described, the specification and drawings are to be regarded in an illustrative rather than a restrictive sense in order to help understand the present invention. It is obvious to those skilled in the art that various modifications and changes can be made thereto without departing from the spirit and scope of the present invention. The scope of the present invention is defined by the appended claims and their equivalents.

What is claimed is:

1. A method of a base station performing multiple user (multi-users) multiple input multiple output (MU-MIMO) communication, the method comprising:
   transmitting a pilot signal to a plurality of terminals of multi-users;
   receiving, from at least one of the plurality of terminals of the multi-users, feedback information including ray gain information based on the pilot signal;
   estimating a channel based on the feedback information;
   configuring a radio frequency (RF) precoder of the base station based on the channel estimation; and
   configuring a baseband precoder of the base station using zero-forcing (ZF) for canceling interference between the plurality of terminals of the multi-users based on the channel estimation,
   wherein the RF precoder comprises at least a first RF precoder for a first RF chain and a second RF precoder for a second RF chain, and
   wherein configuring the RF precoder further comprises:
      configuring a first array steering vector for the first RF chain; and
      configuring a second array steering vector for the second RF chain based on the configured first array steering vector.

2. The method of claim 1, wherein configuring the RF precoder comprises:
   configuring an optimal RF precoder fulfilling a condition of:

$$F_{FR}^{opt} = \underset{F_{RF}}{\mathrm{argmin}} \|F\|_F = \underset{F_{RF}}{\mathrm{argmin}} \|F_{RF} F_{RF}^H H^H (H F_{RF} F_{RF}^H H^H)^{-1}\|_F$$

where $F_{RF}^{opt}$ denotes the optimal RF precoder, $\| \ \|_F$ denotes the Froebenius norm, F denotes the total transmit precoder, $F_{RF}$ denotes the RF precoder, and H denotes a multi-user channel integrating all user channels.

3. The method of claim 1, wherein configuring the RF precoder comprises configuring an array steering vector to minimize the Frobenius norm of the total transmit precoder in sequence.

4. The method of claim 1, wherein transmitting a pilot signal comprises:
   transmitting a pilot signal in accordance with a discrete angle of departure (AOD) set which is preconfigured between the base station and the terminal.

5. The method of claim 4, wherein the discrete AOD set includes AOD sets in a preset range centered around an AOD of a line-of-sight (LOS) ray.

6. The method of claim 1, wherein receiving feedback information comprises:
   receiving a codebook index corresponding to a ray gain vector of a channel of the terminal.

7. The method of claim 1, wherein configuring the RF precoder comprises:
   configuring the RF precoder to minimize a Frobenius norm of a total transmit precoder of the base station for maximizing the sum-rate to the plurality of terminals of the multi-users.

8. A method of a terminal in a multiple user (multi-users) multiple input multiple output (MU-MIMO) communication system, the method comprising:
   receiving a pilot signal from a base station;
   estimating a channel of the terminal using the pilot signal;
   configuring ray gain information based on information of the estimated channel; and
   feeding back a codebook index corresponding to the ray gain information to the base station,
   wherein the codebook index is used by the base station for estimating a channel, configuring a radio frequency (RF) precoder of the base station based on the channel estimation and configuring a baseband precoder of the base station using zero-forcing (ZF) for canceling interference between the terminals of the multi-users based on the channel estimation by the base station,
   wherein the RF precoder comprises at least a first RF precoder for a first RF chain and a second RF precoder for a second RF chain, and
   wherein configuring the RF precoder further comprises configuring a first array steering vector for the first RF chain and configuring a second array steering vector for the second RF chain based on the configured first array steering vector.

9. The method of claim 8, wherein receiving the pilot signal comprises:
   receiving the pilot signal in accordance with a discrete angle of departure (AOD) set which is preconfigured between the base station and the terminal.

10. The method of claim 9, wherein configuring the ray gain information comprises:
    configuring the ray gain information using the information of the estimated channel of the terminal and the discrete AOD set information.

11. The method of claim 9, wherein configuring the ray gain information further comprises:
    configuring the ray gain information fulfilling a condition of:

$$\alpha_k = h_k \cdot pmv(A_k^H)$$

where $a_k$ denotes the ray gain vector, $h_k$ denotes a user-specific channel vector, pmv( ) denotes path metric value, and $A_k$ denotes an array matrix consisting of AOD sets.

12. The method of claim 8, wherein configuring the RF precoder comprises:
configuring the RF precoder to minimize a Frobenius norm of a total transmit precoder of the base station for maximizing the sum-rate to the terminals of the multi-users.

13. A base station capable of performing multiple user (multi-users) multiple input multiple output (MU-MIMO) communication, comprising:
a communication unit; and
a control unit which controls the base station for:
transmitting a pilot signal to a plurality of terminals of multi-users,
receiving feedback information including ray gain information based on the pilot signal from at least one of the plurality of terminals of the multi-users,
estimating channel information based on the feedback information,
configuring a radio frequency (RF) precoder of the base station based on the channel estimation, and
configuring a baseband precoder of the base station using zero-forcing (ZF) for canceling interference between the plurality of terminals of the multi-users based on the channel estimation,
wherein the RF precoder comprises at least a first RF precoder for a first RF chain and a second RF precoder for a second RF chain, and
wherein configuring the RF precoder further comprises:
configuring a first array steering vector for the first RF chain; and
configuring a second array steering.

14. The base station of claim 13, wherein the control unit configures an optimal RF precoder fulfilling a condition of:

$$F_{FR}^{opt} = \underset{F_{RF}}{\operatorname{argmin}} \|F\|_F = \underset{F_{RF}}{\operatorname{argmin}} \|F_{RF}F_{RF}^H H^H (HF_{RF}F_{RF}^H H^H)^{-1}\|_F$$

where $F_{RF}^{opt}$ denotes the optimal RF precoder, $\| \|_F$ denotes the Froebenius norm, F denotes the total transmit precoder, $F_{RF}$ denotes the RF precoder, and H denotes a multi-user channel integrating all user channels.

15. The base station of claim 13, wherein the control unit configures an array steering vector to minimize the Frobenius norm of the total transmit precoder in sequence.

16. The base station of claim 13, wherein the control unit controls the communication unit to transmit a pilot signal in accordance with a discrete angle of departure (AOD) set which is preconfigured between the base station and the terminal.

17. The base station of claim 16, wherein the discrete AOD set includes AOD sets in a preset range centered around an AOD of a line-of-sight (LOS) ray.

18. The base station of claim 13, wherein the control unit is controls the communication unit to receive a codebook index corresponding to a ray gain vector of a channel of the terminal.

19. The base station of claim 13, the control unit configures the RF precoder to minimize a Frobenius norm of a total transmit precoder of the base station for maximizing the sum-rate to the terminals of the multi-users.

20. A terminal capable of performing multiple user (multi-users) multiple input multiple output (SU-MIMO) communication, comprising:
a communication unit; and
a control unit which:
controls the communication unit to receive a pilot signal from a base station,
estimates a channel of the terminal using the pilot signal,
configures ray gain information based on information of the estimated channel, and
controls the communication unit to transmit a codebook index corresponding to the ray gain information to the base station,
wherein the codebook index is used by the base station for estimating channel information, configuring a radio frequency (RF) precoder based on the channel estimation and configuring a baseband precoder of the base station using zero-forcing (ZF) for canceling interference between the terminals of the multi-users based on the channel estimation by the base station,
wherein the RF precoder comprises at least a first RF precoder for a first RF chain and a second RF precoder for a second RF chain, and
wherein configuring the RF precoder further comprises configuring a first array steering vector for the first RF chain and configuring a second array steering vector for the second RF chain based on the configured first array steering vector.

21. The terminal of claim 20, wherein the control unit controls the communication unit to receive the pilot signal in accordance with a discrete angle of departure (AOD) set which is preconfigured between the base station and the terminal.

22. The terminal of claim 21, wherein the control unit configures the ray gain information using the channel information of the terminal and the discrete AOD set information.

23. The terminal of claim 21, wherein the control unit is further configured to configure the ray gain information fulfilling a condition of:

$\alpha_k = h_k pmv(A_k^H)$ where $\alpha_k$ denotes the ray gain vector, $h_k$ denotes a user-specific channel vector, pmv( ) denotes path metric value, and $A_k$ denotes an array matrix consisting of AOD sets.

24. The terminal of claim 20, wherein the control unit configures the RF precoder to minimize a Frobenius norm of a total transmit precoder of the base station for maximizing the sum-rate to the terminals of the multi-users.

* * * * *